US011506883B2

(12) United States Patent
Imai et al.

(10) Patent No.: US 11,506,883 B2
(45) Date of Patent: Nov. 22, 2022

(54) OPTICAL WAVELENGTH SELECTING FILTER-MODULE AND OPTICAL WAVELENGTH SELECTING METHOD

(71) Applicant: NIPPON TELEGRAPH AND TELEPHONE CORPORATION, Tokyo (JP)

(72) Inventors: Takeshi Imai, Musashino (JP); Takuya Kanai, Musashino (JP); Yumiko Senoo, Musashino (JP); Kota Asaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/415,099

(22) PCT Filed: Dec. 5, 2019

(86) PCT No.: PCT/JP2019/047614
§ 371 (c)(1),
(2) Date: Jun. 17, 2021

(87) PCT Pub. No.: WO2020/137419
PCT Pub. Date: Jul. 2, 2020

(65) Prior Publication Data
US 2022/0043253 A1    Feb. 10, 2022

(30) Foreign Application Priority Data
Dec. 25, 2018    (JP) .............................. JP2018-241623

(51) Int. Cl.
H04J 14/02    (2006.01)
G02B 26/00    (2006.01)

(52) U.S. Cl.
CPC ............ G02B 26/007 (2013.01); H04J 14/02 (2013.01)

(58) Field of Classification Search
CPC ........ G02B 26/007; G02B 5/20; G02B 5/207; G02B 26/00; G02B 26/002; G02B 26/008;
(Continued)

(56) References Cited

U.S. PATENT DOCUMENTS

2003/0007545 A1* 1/2003 Hashimoto .............. G01K 7/42
374/E7.042
2004/0170109 A1    9/2004 Asada et al.
(Continued)

FOREIGN PATENT DOCUMENTS

CN    1558410 A    12/2004
JP    2000121965 A    4/2000
(Continued)

OTHER PUBLICATIONS

Haruo Takashashi,"Temperature stability of thin-film narrow-bandpass filters produced by ion-assisted deposition", Applied Optics, vol. 34, No. 4, Feb. 1, 1995, pp. 667-675.

Primary Examiner — Hibret A Woldekidan

(57) ABSTRACT

An optical wavelength selecting filter-module into which light is incident from a prescribed direction determined in advance, the optical wavelength-selective filter module including: an optical filter of which an orientation can be changed; a frequency information acquiring unit which acquires frequency information that is information indicating a frequency of light to be transmitted through the optical filter; a temperature information acquiring unit which acquires temperature information that indicates a temperature of the optical filter; a determining unit which determines an orientation of the optical filter based on relationship information that is information associating, for each prescribed frequency, the temperature and an orientation of the optical filter at which light of the frequency is transmitted through the optical filter at transmittance equal to or higher than prescribed transmittance at the temperature, a temperature indicated by the temperature information, and a frequency indicated by the frequency information; and an actuator which points the optical filter in an orientation having been determined by the determining unit.

3 Claims, 9 Drawing Sheets

(58) Field of Classification Search
CPC .......................... G02B 27/288; G02B 6/2938; G02B 6/29395; G02B 6/29398; G02B 6/12007; G02B 5/28; G02B 6/4215; H04J 14/02; G02F 1/0147; H04Q 2011/0009
USPC ........................................ 398/79, 85, 95, 48
See application file for complete search history.

(56) References Cited

U.S. PATENT DOCUMENTS

| | | | |
|---|---|---|---|
| 2008/0158552 A1* | 7/2008 | Tokunaga | G01N 21/253 356/73 |
| 2011/0299559 A1 | 12/2011 | Mitamura | |

FOREIGN PATENT DOCUMENTS

| | | |
|---|---|---|
| JP | 2003329938 A | 11/2003 |
| JP | 2005172975 A | 6/2005 |
| JP | 2011258704 A | 12/2011 |

* cited by examiner

| | 1_1-TH TEMPERATURE RANGE | 2_1-TH TEMPERATURE RANGE | 3_1-TH TEMPERATURE RANGE |
|---|---|---|---|
| FREQUENCY 1 | $\theta 1\_1$ | $\theta 2\_1$ | $\theta 3\_1$ |
| ... | ... | ... | ... |
| FREQUENCY k | 1_k-TH TEMPERATURE RANGE | 2_k-TH TEMPERATURE RANGE | 3_k-TH TEMPERATURE RANGE |
| | $\theta 1\_k$ | $\theta 2\_k$ | $\theta 3\_k$ |
| ... | ... | ... | ... |
| FREQUENCY N | 1_N-TH TEMPERATURE RANGE | 2_N-TH TEMPERATURE RANGE | 3_N-TH TEMPERATURE RANGE |
| | $\theta 1\_N$ | $\theta 2\_N$ | $\theta 3\_N$ |

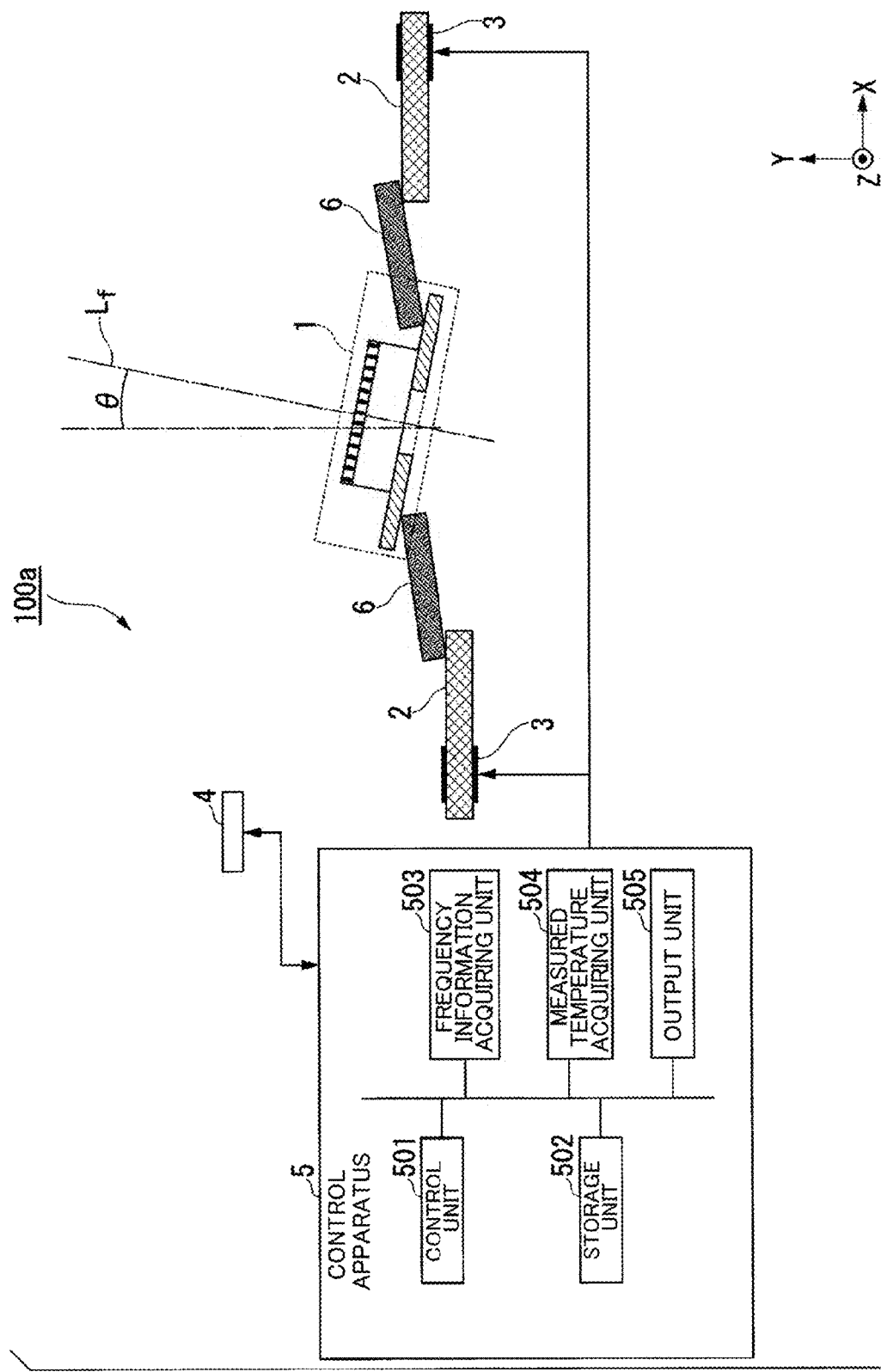

OPTICAL WAVELENGTH SELECTING FILTER-MODULE AND OPTICAL WAVELENGTH SELECTING METHOD

CROSS-REFERENCE TO RELATED APPLICATIONS

This application is a 371 U.S. National Phase of International Application No. PCT/JP2019/047614 filed on Dec. 5, 2019, which claims priority to Japanese Application No. 2018-241623 filed on Dec. 25, 2018. The entire disclosures of the above applications are incorporated herein by reference.

TECHNICAL FIELD

The present invention relates to an optical wavelength selecting filter-module and an optical wavelength selecting method.

BACKGROUND ART

Recent increases in demand for information communication amount facilitate commercialization and development of optical communication systems with ever-larger capacities. Increases in the capacity of optical communication systems are often brought about by a WDM (Wavelength-division multiplexing) technique that uses, within a communication transmission medium thereof, a large number of optical carrier waves with different optical wavelengths. In this case, intervals of the optical wavelengths can be set to small intervals in order to increase multiplicity. For example, an optical access system defined in ITU-T G.989 requires that frequency intervals between optical carrier waves be set to 100 GHz. This equates to approximately 0.8 nm in terms of optical wavelength. WDM is realized by placing, inside an optical receiver of an ONU (Optical network unit) which is an apparatus that terminates an optical access system, an optical wavelength-selective module that selects a single arbitrary wavelength from optical carrier waves arranged side by side at the 100 GHz intervals.

A dielectric multilayer film filter of which a width of a band of transmitted optical wavelengths is sufficiently narrower than the intervals of optical carrier waves and which is capable of transmitting only one optical carrier wave and a mechanism which sets a transmitted optical wavelength by controlling an inclination angle of the filter are placed in the optical wavelength-selective module, and a desired optical carrier wave can be selected as needed by operating the mechanism.

However, a dielectric multilayer film filter has a characteristic in that an optical wavelength to be transmitted shifts according to surrounding environment temperature. This is attributable to thermal expansion of the dielectric multilayer film. According to NPL 1, although there are differences depending on materials, a wavelength shift of around +0.01 nm occurs per a rise of 1° C. in surrounding environment temperature. Supposing that an operating environment temperature of the optical wavelength-selective filter module mounted inside the ONU ranges from 0° C. to 70° C., an optical wavelength to be transmitted by the dielectric multilayer film filter is to vary by approximately 0.7 nm which is non-negligible with respect to the intervals of optical carrier waves of approximately 0.8 nm. As a result, a need arises to perform temperature compensation with respect to the transmission wavelength of the filter.

Optical communication apparatuses using WDM are often installed at a node location of a communication business provider where temperature is well-managed. Therefore, while similar problems could have occurred in optical multiplexing systems to date, wavelength shifts caused by temperature were also relatively small. In addition, since the optical communication apparatus itself is often a large-scale node apparatus that controls a large number of communication signals, incorporation of a mechanism for measuring a magnitude of a wavelength shift or a mechanism for performing compensation of a wavelength shift into the optical communication apparatus can be readily realized.

Prior examples of a wavelength compensation technique for an optical filter include a technique proposed in PTL 1. The technique described in PTL 1 is a technique which, by operating an optical filter so as to track a wavelength variation of signal light that is transmitted through the optical filter, compensates a wavelength of light that is transmitted through the optical filter. Specifically, the technique described in PTL 1 first observes light intensity that is transmitted through the optical filter while causing a transition of a wavelength of the optical filter, and adopts a portion that minimizes a difference in light intensity as a wavelength of signal light. Next, the technique described in PTL 1 measures a surrounding temperature of the optical filter and, based on a measurement result, compensates for a wavelength shift of a wavelength of light that is transmitted through the optical filter, the wavelength shift having been caused by a temperature variation. The technique described in PTL 1 divides a part of light after being transmitted through the optical filter with an optical branching device, guides a part of light after the division to a detector for intensity measurement, and measures light intensity that is transmitted through the optical filter with the detector.

CITATION LIST

Patent Literature

[PTL 1] Japanese Patent Application Laid-open No. 2005-172975

Non Patent Literature

[NPL 1] Haruo Takashashi, "Temperature stability of thin-film narrow-bandpass filters produced by ion-assisted deposition", Applied Optics, Vol. 34, No. 4, 1 Feb. 1995, pp. 667-675.

SUMMARY OF THE INVENTION

Technical Problem

ONU is an apparatus of which one unit is used by each user of a communication service. Therefore, a mechanism that compensates for a wavelength shift caused by a temperature of a dielectric multilayer film filter that is used in an ONU of an optical access system is desirably a mechanism which can be realized at a low cost and which enables ONUs having the mechanism to be readily mass-produced. In other words, the simpler the mechanism that compensates for a wavelength shift caused by a temperature of the dielectric multilayer film filter that is used in the ONU of an optical access system, the better.

However, when using the mechanism described in PTL 1 in an optical access system, transmitted light intensity must be measured by the ONU. This means that, when compensating for a wavelength shift with the mechanism described in PTL 1, the ONU must include a mechanism for measuring light intensity. Therefore, when compensating for a wavelength shift with the mechanism described in PTL 1, the mechanism of the ONU becomes complex.

In consideration of the circumstances described above, an object of the present invention is to provide an optical wavelength-selective filter module capable of realizing both compensation of a shift in transmission frequency (transmission wavelength) caused by a temperature variation of an optical filter and simplification of an apparatus.

Means for Solving the Problem

An aspect of the present invention is an optical wavelength-selective filter module into which light is incident from a prescribed direction determined in advance, the optical wavelength-selective filter module including: an optical filter of which an orientation can be changed; a frequency information acquiring unit which acquires frequency information that is information indicating a frequency of light to be transmitted through the optical filter; a temperature information acquiring unit which acquires temperature information that indicates a temperature of the optical filter; a determining unit which determines an orientation of the optical filter based on relationship information that is information associating, for each prescribed frequency, the temperature and an orientation of the optical filter at which light of the frequency is transmitted through the optical filter at transmittance equal to or higher than prescribed transmittance at the temperature, a temperature indicated by the temperature information having been acquired by the temperature information acquiring unit, and a frequency indicated by the frequency information having been acquired by the frequency information acquiring unit; and an actuator which points the optical filter in an orientation having been determined by the determining unit.

An aspect of the present invention is the optical wavelength-selective filter module described above, wherein an orientation of the optical filter is changed by a rotation around a rotation axis that is perpendicular to an optical path of the light, the determining unit determines an incidence angle of the light with respect to the optical filter as the orientation, and the actuator rotates the optical filter in accordance with the incidence angle determined by the determining unit.

An aspect of the present invention is the optical wavelength-selective filter module described above, further including a deforming element which deforms into a prescribed shape in accordance with a temperature as a result of a change in the temperature, wherein the orientation of the optical filter is changed by at least one of a drive by the actuator and a deformation of the deforming element.

An aspect of the present invention is an optical wavelength selection method that is performed by an optical wavelength-selective filter module which includes an optical filter of which an orientation can be changed, a frequency information acquiring unit which acquires frequency information that is information indicating a frequency of light to be transmitted through the optical filter; a temperature information acquiring unit which acquires temperature information that indicates a temperature of the optical filter; and an actuator which changes an orientation of the optical filter, light being incident to the optical wavelength-selective filter module from a prescribed direction determined in advance, the optical wavelength selection method including: a frequency information acquisition step of acquiring the frequency information; a temperature information acquisition step of acquiring the temperature information; a determination step of determining an orientation of the optical filter based on relationship information that is information associating, for each prescribed frequency, the temperature and an orientation of the optical filter at which light of the frequency is transmitted through the optical filter at transmittance equal to or higher than prescribed transmittance at the temperature, a temperature indicated by the temperature information having been acquired in the temperature information acquisition step, and a frequency indicated by the frequency information having been acquired in the frequency information acquisition step; and an orientation changing step of pointing the optical filter in the orientation having been determined in the determination step.

Effects of the Invention

According to the present invention, both compensation of a shift in transmission frequency (transmission wavelength) caused by a temperature variation of an optical filter and simplification of an apparatus can be realized.

BRIEF DESCRIPTION OF DRAWINGS

FIG. 10 is a diagram showing an example of the optical wavelength-selective filter module 100a according to the second embodiment in a state where the optical filter 1 has been rotated.

DESCRIPTION OF EMBODIMENTS

First Embodiment

Figure 1:
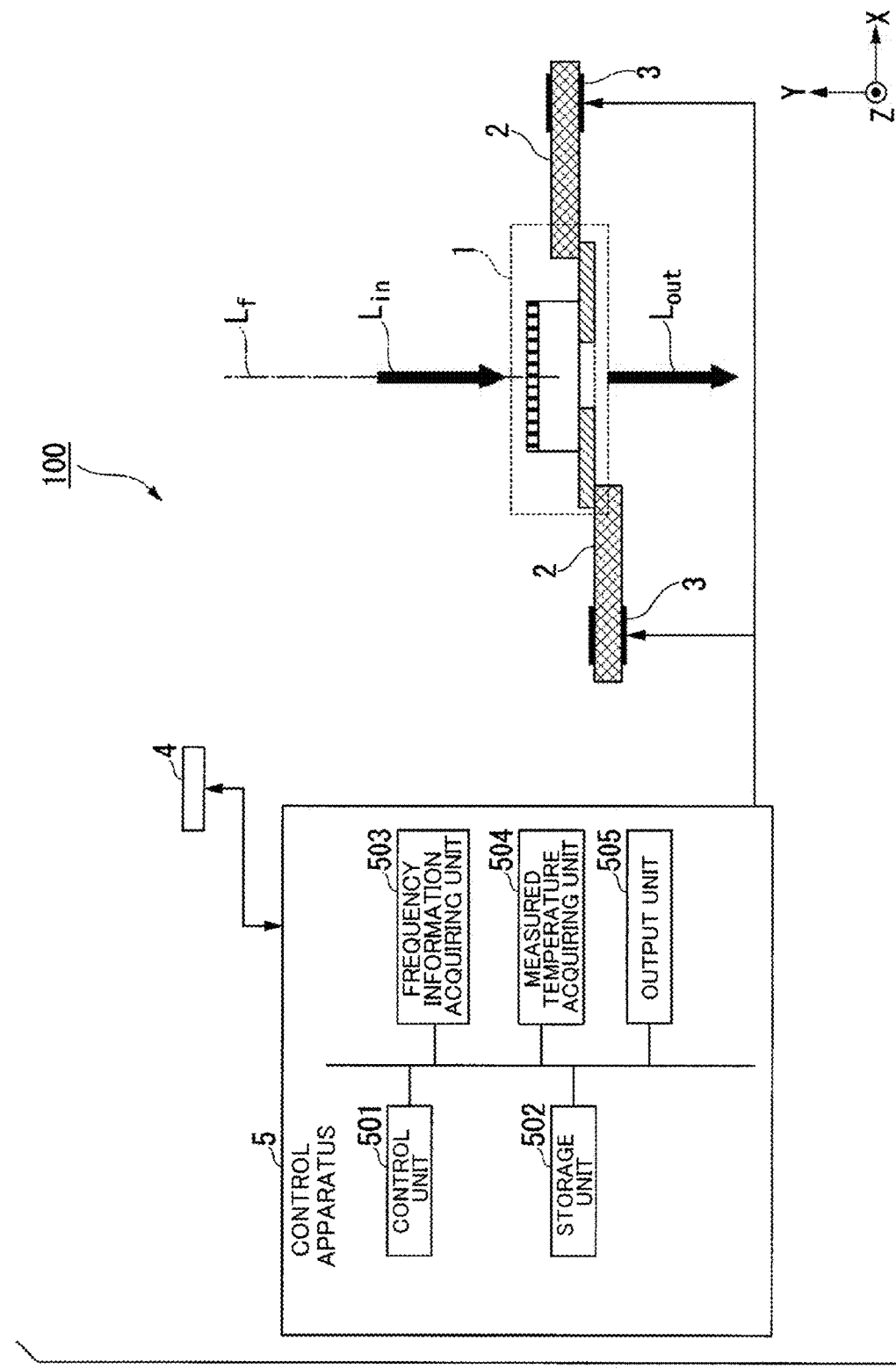
FIG. 1 is a diagram showing an example of a functional configuration of an optical wavelength-selective filter module 100 according to a first embodiment.

FIG. 1 is a diagram showing an example of a functional configuration of an optical wavelength-selective filter module (an optical wavelength-selective filter) 100 according to a first embodiment.

More specifically, the optical wavelength-selective filter module 100 includes an optical filter and transmits light of the frequency indicated by the frequency information among light incident to the optical filter from a prescribed direction determined in advance as viewed from the reference plane at transmittance that is equal to the reference transmittance.

Hereinafter, the frequency of light that is transmitted through the optical wavelength-selective filter module 100 at transmittance that is equal to or higher than the reference transmittance will be referred to as a transmission frequency. The optical wavelength-selective filter module 100 compensates for a shift in the transmission frequency which is created by a temperature variation of the optical filter by changing an orientation of the optical filter, and transmits light of the frequency indicated by the frequency information at transmittance that is equal to or higher than the reference transmittance.

Hereinafter, light incident to an optical filter 1 will be referred to as incident light Lin and light after being transmitted through the optical filter 1 will be referred to as transmitted light Lout.

The reference plane may be any kind of plane as long as the plane is fixed with respect to a space in which the optical wavelength-selective filter module 100 is positioned. Hereinafter, for the sake of brevity, the reference plane is assumed to be a plane that is parallel to an XZ plane in FIG. 1.

Hereinafter, for the sake of brevity, the prescribed incidence direction is assumed to be a direction that is perpendicular to the reference plane. When the reference plane is a plane that is parallel to the XZ plane in FIG. 1, the prescribed incidence direction is a direction that is parallel to a Y axis in FIG. 1.

The optical wavelength-selective filter module 100 includes the optical filter 1, an actuator 2, a drive unit 3, a temperature measuring element 4, and a control apparatus 5.

The optical filter 1 is an optical filter having a transmission frequency in accordance with a combination of a temperature of the optical filter 1 and an incidence angle of the incident light Lin that is incident to the optical filter (hereinafter, referred to as a "first combination"). The incident light Lin is light that is incident to the optical filter 1 from a prescribed incidence direction determined in advance as viewed from the reference plane. The incidence angle of the incident light Lin (hereinafter, referred to as a "filter incidence angle") is an angle formed between a filter perpendicular line Lf and an optical path of the incident light Lin. The filter perpendicular line Lf is a line that is perpendicular to a tangent plane of the optical filter 1 at a location where the incident light Lin is incident to the optical filter 1. Hereinafter, the temperature of the optical filter 1 will be referred to as a filter temperature.

An orientation of the optical filter 1 can be changed. For example, the orientation of the optical filter 1 is changed by a rotation around a prescribed rotation axis that is perpendicular to the optical path of the incident light Lin.

When the filter incidence angle is constant, the optical filter 1 has transmission frequency characteristics in accordance with the filter temperature. The fact that transmission frequency characteristics of the optical filter 1 are characteristics in accordance with the filter temperature is due to variations in physical property values such as permittivity of the optical filter 1 in accordance with a change in the filter temperature.

When the filter temperature is constant, the optical filter 1 has transmission frequency characteristics in accordance with the filter incidence angle. The fact that transmission frequency characteristics of the optical filter 1 are characteristics in accordance with the filter incidence angle is due to a variation in a wave vector of the incident light Lin as viewed from the optical filter 1 in accordance with a change in the filter incidence angle.

The optical filter 1 may be any kind of optical filter as long as the optical filter has a transmission frequency in accordance with the first combination. For example, the optical filter 1 may be an optical filter having a periodic structure that is more or less equal to the wavelength of light. For example, an optical filter having a periodic structure that is more or less equal to the wavelength of light may be a dielectric multilayer film. For example, an optical filter having a periodic structure that is more or less equal to the wavelength of light may be a photonic crystal. For example, the optical filter 1 may be an optical filter having a periodic structure that is equal to or shorter than the wavelength of light. For example, an optical filter having a periodic structure that is equal to or shorter than the wavelength of light may be a plasmonic crystal.

Hereinafter, for the sake of brevity, the optical filter 1 is assumed to be a dielectric multilayer film.

When the optical filter 1 is a dielectric multilayer film, the filter incidence angle is 0 deg when a dielectric multilayer film plane is parallel to a reference plane and an incidence direction of the incident light Lin is a direction that is perpendicular to the reference plane.

Hereinafter, for the sake of brevity, it is assumed that transmittance of light that is transmitted through the optical wavelength-selective filter module 100 is the same as transmittance of light that is transmitted through the optical filter 1. Therefore, the optical filter 1 may transmit light of a transmission frequency at transmittance that is equal to or higher than reference transmittance.

Hereinafter, for the sake of brevity, the transmission frequency characteristics of the optical filter 1 with respect to each first combination are assumed to be characteristics having a single peak with a maximum value that is equal to or higher than the reference transmittance within a prescribed frequency range determined in advance. The prescribed frequency range determined in advance is, for example, a frequency range equal to or lower than a lowest frequency (hereinafter, referred to as a "lowest filter frequency") among frequencies of light transmitted through the optical filter 1 at transmittance that is equal to or higher than the reference transmittance when the filter incidence angle is 0 deg.

Hereinafter, for the sake of brevity, a full width at half maximum of the peak is assumed to be approximately the same regardless of the first combination.

Hereinafter, a frequency of light corresponding to the peak of transmittance that is included in the transmission frequency characteristics will be referred to as a peak frequency.

When the optical filter 1 is a dielectric multilayer film and the incidence direction of the incident light Lin is a vertical direction, the peak frequency when the filter incidence angle is 0 deg is the lowest filter frequency.

When the optical filter 1 is a dielectric multilayer film and the incidence direction of the incident light Lin is the vertical direction, with the filter incidence angle being 0 deg, a peak wavelength shifts toward a shorter wavelength side in proportion to cos θ. In this case, the peak wavelength refers to a wavelength of light at the peak frequency.

When the filter incidence angle θ is approximately equal to 0, the peak wavelength is approximately proportional to 1−θ^2/2. As described above, a shift amount of the peak wavelength is in a relationship of a one-to-one correspondence with the filter incidence angle θ and the peak wavelength shifts toward the shorter wavelength side in accordance with a magnitude of θ^2. It should be noted that θ^2 stands for the square of θ.

Figure 2:
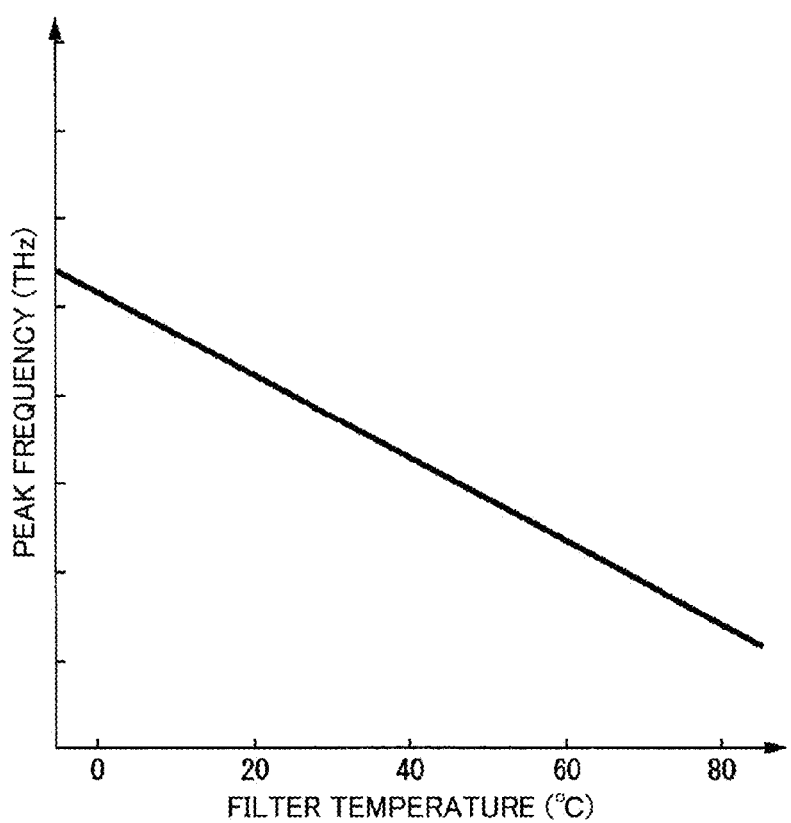
FIG. 2 is a diagram showing an example of filter temperature dependency of a peak frequency under a condition requiring that an incidence angle of incident light Lin according to the first embodiment be constant regardless of filter temperature.

FIG. 2 is a diagram showing an example of filter temperature dependency of a peak frequency under a condition requiring that an incidence angle of the incident light Lin according to the first embodiment be constant regardless of filter temperature.

An abscissa in FIG. 2 represents filter temperature. An ordinate in FIG. 2 represents peak frequency.

FIG. 2 shows that, when the incidence angle of the incident light Lin is constant, the higher the filter temperature, the lower the peak frequency. The filter temperature dependency of the peak frequency is, for example, approximately −1.2 GHz/° C. in a vicinity of a frequency of 187.8 THz.

Let us return to the description of FIG. 1.

The actuator 2 changes the orientation of the optical filter 1. More specifically, the actuator 2 points the optical filter 1 in a prescribed orientation in accordance with the frequency information and the temperature of the optical filter 1. For example, the actuator 2 points the optical filter 1 in a prescribed orientation by rotating the optical filter 1 around a prescribed rotation axis that is perpendicular to the optical path of the incident light Lin. For example, the prescribed rotation axis that is perpendicular to the optical path of the incident light Lin may be a virtual axis which is parallel to a Z axis in FIG. 1 and which passes through the optical filter 1. For example, the prescribed rotation axis that is perpendicular to the optical path of the incident light Lin may be an axis that is parallel to the XZ plane in FIG. 1.

Hereinafter, for the sake of brevity, it is assumed that the actuator 2 rotates the optical filter 1 using a prescribed axis which is parallel to the Z axis in FIG. 1 and which passes through the optical filter 1 as the rotation axis.

When the actuator 2 changes the orientation of the optical filter 1, the incidence angle of the incident light Lin changes. For example, when the actuator 2 rotates the optical filter 1 by an angle θ, the incidence angle of the incident light Lin or, in other words, the filter incidence angle changes by the angle θ.

Figure 3:
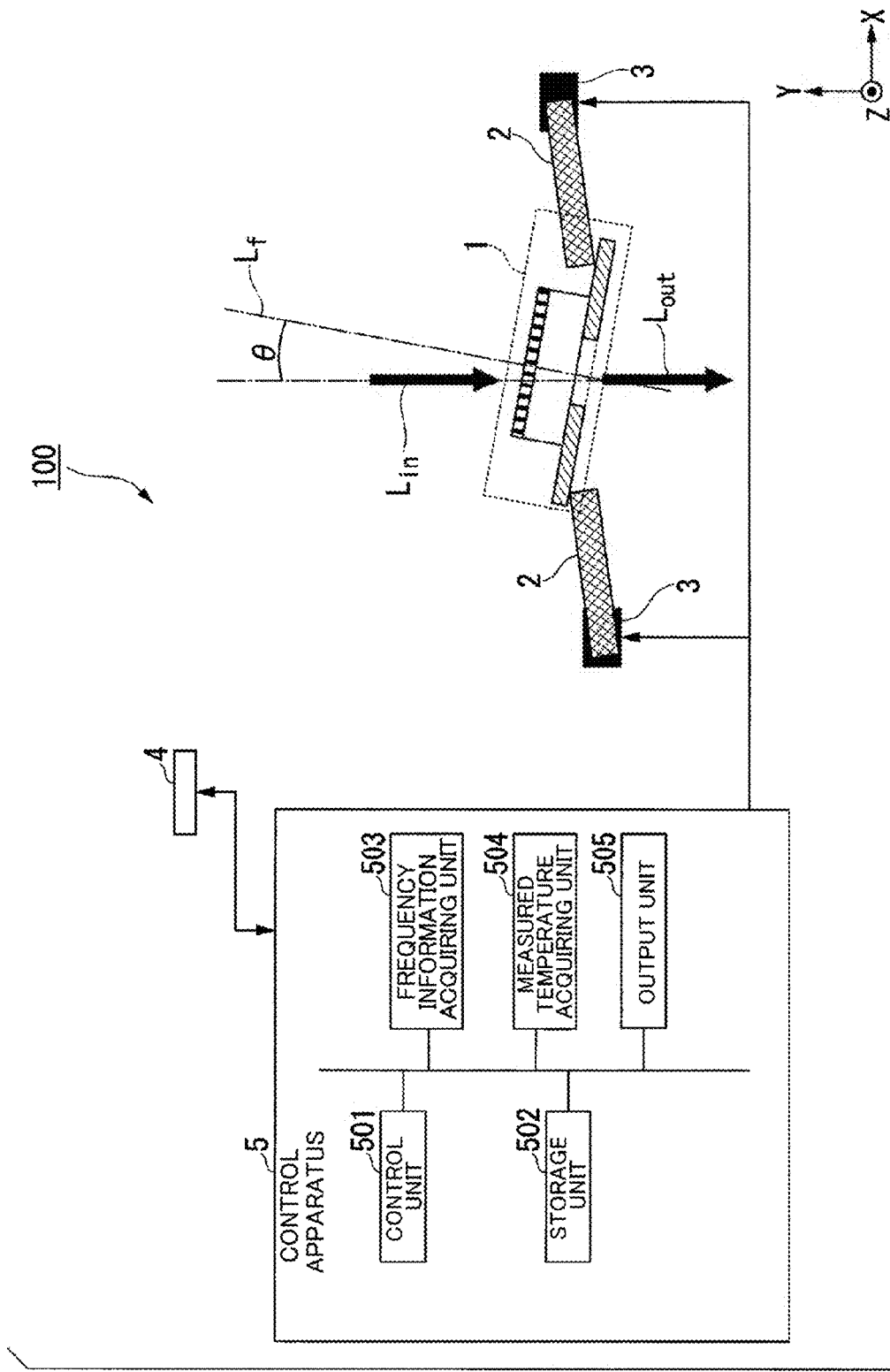
FIG. 3 is a diagram showing an example of the optical wavelength-selective filter module 100 according to the first embodiment in a state where an optical filter 1 has been rotated by an actuator 2.

FIG. 3 is a diagram showing an example of the optical wavelength-selective filter module 100 according to the first embodiment in a state where the optical filter 1 has been rotated by the actuator 2.

FIG. 3 shows that the optical filter 1 has been rotated by the angle θ from the state shown in FIG. 1. When the filter incidence angle shown in FIG. 1 is 0 deg, the filter incidence angle in FIG. 3 is θ.

Let us return to the description of FIG. 1.

The drive unit 3 drives the actuator 2. When the actuator 2 is driven by the drive unit 3, the optical filter 1 is rotated by the drive of the actuator 2. The drive unit 3 may drive the actuator 2 with any mechanism. For example, the drive unit 3 may drive the actuator 2 by applying voltage or a current to the actuator 2. For example, the drive unit 3 may drive the actuator 2 by applying heat to the actuator 2. For example, the drive unit 3 may drive the actuator 2 by applying a magnetic field to the actuator 2.

The temperature measuring element 4 measures a temperature of a measurement location. The measurement location may be any location as long as a temperature thereof indicates the temperature of the optical filter 1. For example, the location indicating the temperature of the optical filter 1 may be a location of which a temperature is in a relationship of a one-to-one correspondence with the temperature of the optical filter 1. For example, the measurement location may be a surface of the optical filter 1. For example, the measurement location may be a position in a vicinity of the optical filter 1. For example, the temperature measuring element 4 is a thermometer.

The temperature measured by the temperature measuring element 4 (hereinafter, referred to as an "element measured temperature") is output to the control apparatus 5. Hereinafter, for the sake of brevity, it is assumed that the element measured temperature and the filter temperature are the same. The temperature measuring element 4 outputs temperature information that is information indicating the element measured temperature to the control apparatus 5.

The control apparatus 5 controls operations of the drive unit 3 based on the element measured temperature. The control apparatus 5 includes a control unit 501, a storage unit 502, a frequency information acquiring unit 503, a measured temperature acquiring unit 504, and an output unit 505. The control unit 501 controls operations of the respective functional units included in the control apparatus 5.

The storage unit 502 stores information indicating the orientation of the optical filter 1. Hereinafter, the information which indicates the orientation of the optical filter 1 and which is stored in the storage unit 502 will be referred to as filter orientation information. The filter orientation information may be any information indicating the orientation of the optical filter 1 in any way as long as the information indicates the orientation of the optical filter 1. For example, the filter orientation information may be a filter incidence angle.

Hereinafter, for the sake of brevity, it is assumed that the filter orientation information is information indicating a filter incidence angle.

As will be described later, the storage unit 502 stores, for each prescribed frequency, information that associates the element measured temperature and the orientation of the optical filter 1 with each other as relationship information. In this case, the orientation of the optical filter 1 is assumed to be an orientation at which light of the prescribed frequency is transmitted through the optical filter 1 at transmittance equal to or higher than prescribed transmittance at the element measured temperature.

The relationship information may be a function determined in advance to which the frequency of light and the element measured temperature are input and which outputs the filter incidence angle. The relationship information may be a table which indicates, for each prescribed frequency, a correspondence between the element measured temperature and the orientation of the optical filter 1.

Figures 4, 5:
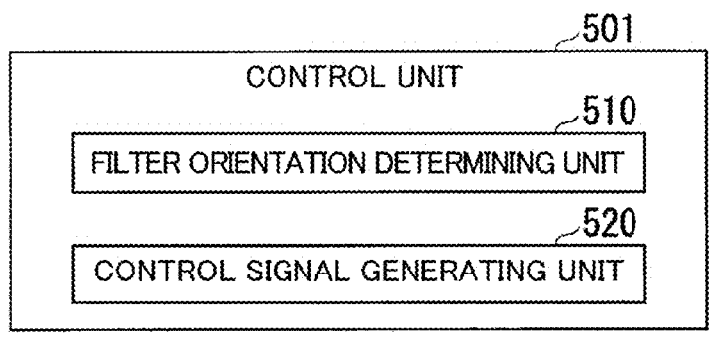
FIG. 4 is a diagram showing an example of relationship information according to the first embodiment.
FIG. 5 is a diagram showing an example of a functional configuration of a control unit 501 according to the first embodiment.

FIG. 4 is a diagram showing an example of the relationship information according to the first embodiment. For example, the relationship information is stored in the storage unit 502 as a relationship information table 101T shown in FIG. 4. The relationship information table 101T has a record for each "frequency". Each record has respective values of "frequency", "first temperature range", "second temperature range", "third temperature range", and "θ1", "θ2", and "θ3"

which are pieces of filter orientation information that are associated with the respective temperature ranges. "Frequency" represents a frequency of light to be transmitted by the optical wavelength-selective filter module 100.

More specifically, when the relationship information table 101T has N-number of records (where N denotes an integer equal to or larger than 1), a k-th record (where k denotes an integer equal to or larger than 1 and equal to or smaller than N) has respective values of "frequency k", "1_k-th temperature range", "2_k-th temperature range", "3_k-th temperature range", and "θ1_k", "θ2_k", and "θ3_k" which are pieces of filter orientation information that are associated with the respective temperature ranges.

The "1_k-th temperature range" is associated with the filter orientation information "θ1_k" in which a frequency indicated by "frequency k" is adopted as the transmission frequency when the element measured temperature is a temperature within the 1_k-th temperature range. The 1_k-th temperature range represents temperatures that are equal to or higher than a 1_k-th temperature and lower than a 2_k-th temperature. The 1_k-th temperature and the 2_k-th temperature are temperatures having been determined in advance, in which case the 2_k-th temperature is a higher temperature than the 1_k-th temperature.

The "2_k-th temperature range" is associated with the filter orientation information "θ2_k" in which a frequency indicated by "frequency k" is adopted as the transmission frequency when the element measured temperature is a temperature within the 2_k-th temperature range. The 2_k-th temperature range represents temperatures that are equal to or higher than the 2_k-th temperature and lower than a 3_k-th temperature. The 3_k-th temperature is a temperature which has been determined in advance and which is a higher temperature than the 2_k-th temperature.

The "3_k-th temperature range" is associated with the filter orientation information "θ3_k" in which a frequency indicated by "frequency k" is adopted as the transmission frequency when the element measured temperature is a temperature within the 3_k-th temperature range. The 3_k-th temperature range represents temperatures that are equal to or higher than the 3_k-th temperature and lower than a 4_k-th temperature. The 4-th temperature is a temperature which has been determined in advance and which is a higher temperature than the 3_k-th temperature.

The 1_k-th to 4_k-th temperatures may be any kind of temperature as long as the optical wavelength-selective filter module 100 is operable at the temperature. In addition, a lower limit temperature (in the present example, the 1_k-th temperature) and an upper limit temperature (in the present example, the 4_k-th temperature) in a guaranteed operating temperature range need not be set in the relationship information table 101T.

Let us return to the description of FIG. 1.

The frequency information acquiring unit 503 acquires frequency information of light to be transmitted by the optical wavelength-selective filter module 100. The frequency information acquiring unit 503 may be configured in any way as long as frequency information can be acquired. For example, the frequency information acquiring unit 503 may be configured as an interface that connects its host apparatus to an apparatus that outputs the frequency information. In this case, the frequency information acquiring unit 503 acquires, via the interface, the frequency information output by the apparatus that outputs the frequency information.

The measured temperature acquiring unit 504 acquires temperature information that is information indicating the element measured temperature from the temperature measuring element 4. The measured temperature acquiring unit 504 may be configured in any way as long as temperature information can be acquired from the temperature measuring element 4. For example, the measured temperature acquiring unit 504 may be configured as an interface that connects the host apparatus to the temperature measuring element 4. In this case, the measured temperature acquiring unit 504 acquires, via the interface, the temperature information output by the temperature measuring element 4. It should be noted that the measured temperature acquiring unit 504 is an example of the temperature information acquiring unit.

The output unit 505 outputs a control signal for controlling operations of the drive unit 3. The output unit 505 may be configured in any way as long as the control signal can be output to the drive unit 3. For example, the output unit 505 may be configured as an interface that connects the host apparatus to the drive unit 3. In this case, the output unit 505 outputs the control signal to the drive unit 3 via the interface.

FIG. 5 is a diagram showing an example of a functional configuration of the control unit 501 according to the first embodiment.

The control unit 501 includes a filter orientation determining unit 510 and a control signal generating unit 520.

The filter orientation determining unit 510 executes filter orientation determination processing. The filter orientation determination processing is processing in which, based on the frequency information, the element measured temperature, and the relationship information, the filter orientation determining unit 510 determines an orientation of the optical filter 1 which transmits light of a frequency indicated by the frequency information at the element measured temperature. Hereinafter, the orientation of the optical filter 1 having been determined by the filter orientation determining unit 510 by the filter orientation determination processing will be referred to as a determined orientation. When the filter orientation information is information indicating a filter incidence angle, the determined orientation indicates the orientation of the optical filter 1 with the filter incidence angle.

The control signal generating unit 520 generates a signal (hereinafter, referred to as an "orientation control signal") which controls operations of the drive unit 3 so that the optical filter 1 is pointed in the determined orientation by the operations of the drive unit 3. The control signal generating unit 520 outputs the generated orientation control signal to the drive unit 3 via the output unit 505. The drive unit 3 having acquired the orientation control signal operates so that the optical filter 1 is pointed in the determined orientation. The drive unit 3 having acquired the orientation control signal may perform any operation based on any kind of control signal as long as the operation causes the optical filter 1 to be pointed in the determined orientation.

Figure 6:
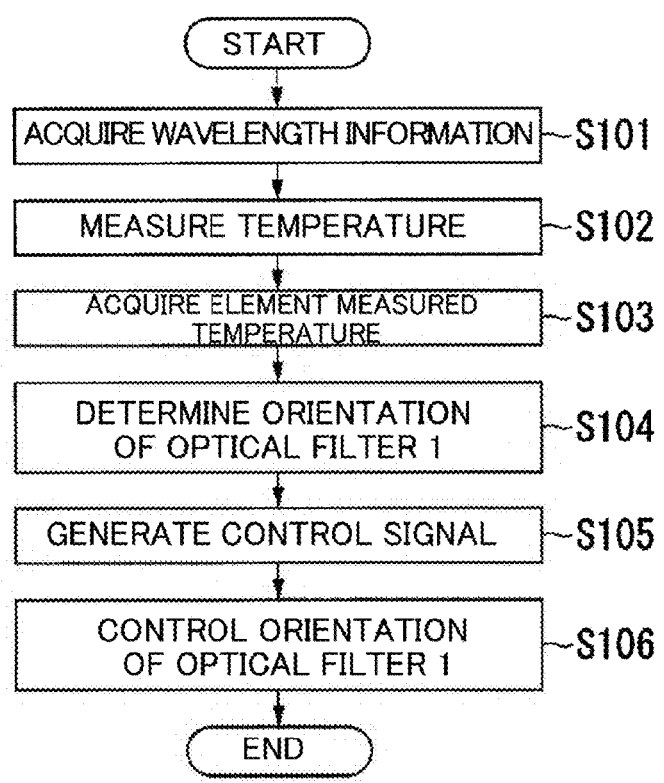
FIG. 6 is a flow chart showing an example of processing by which the optical wavelength-selective filter module 100 according to the first embodiment changes a peak frequency.

FIG. 6 is a flow chart showing an example of processing by which the optical wavelength-selective filter module 100 according to the first embodiment changes a transmission frequency and performs temperature compensation.

The frequency information acquiring unit 503 acquires frequency information (step S101). The temperature measuring element 4 measures a temperature of a measurement location (step S102). The measured temperature acquiring unit 504 acquires the element measured temperature acquired in step S102 (step S103).

The filter orientation determining unit 510 executes filter orientation determination processing (step S104). Specifically, the filter orientation determining unit 510 determines, based on the frequency information, the element measured temperature, and the relationship information, an orientation of the optical filter 1 which transmits light of a frequency indicated by the frequency information at the element measured temperature.

The control signal generating unit 520 generates an orientation control signal (step S105). The generated orientation control signal is output to the drive unit 3 via the output unit 505. The drive unit 3 having acquired the orientation control signal operates so that the optical filter 1 is pointed in the determined orientation (step S106).

Figure 7:
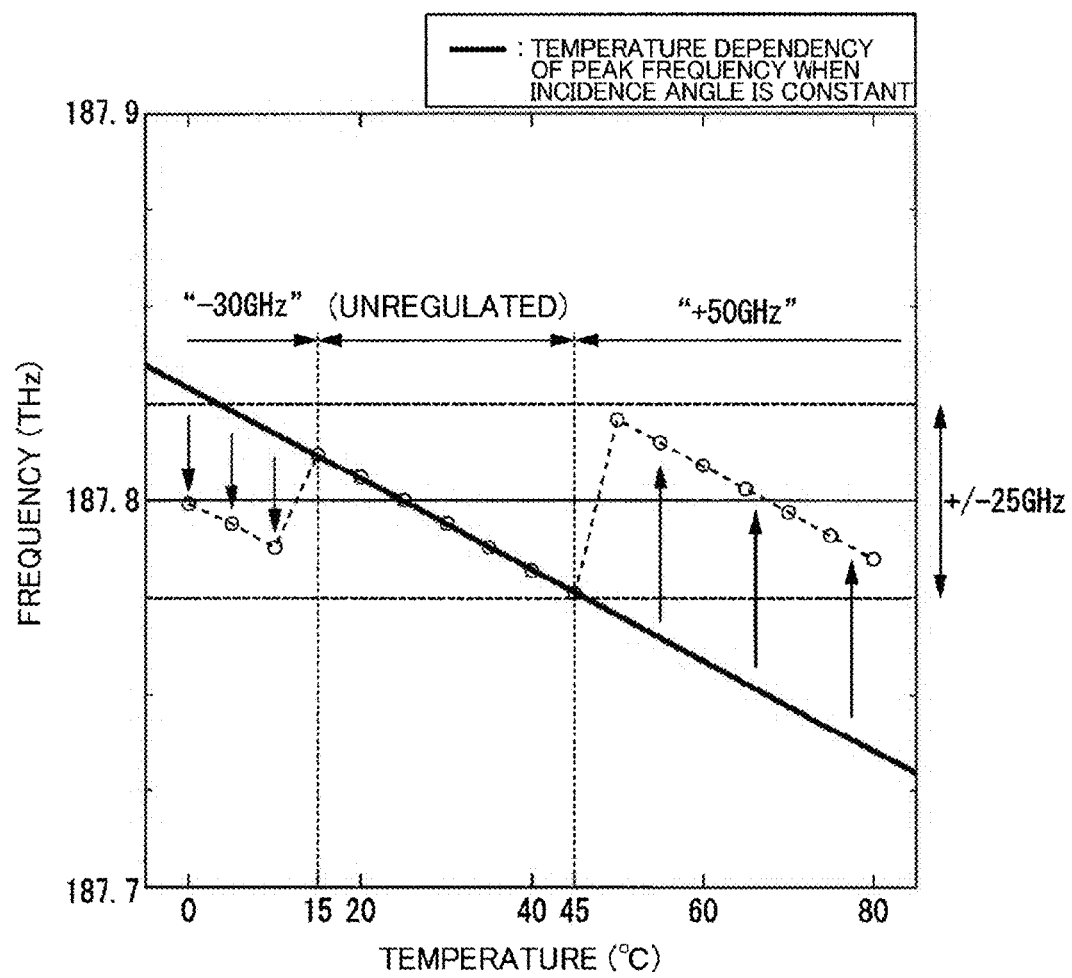
FIG. 7 is a diagram showing an example of a change in a peak frequency caused by rotating the optical filter 1 based on an element measured temperature according to the first embodiment.

FIG. 7 is a diagram showing an example of a change in peak frequency caused by changing the orientation of the optical filter 1 based on the element measured temperature according to the first embodiment.

Hereinafter, for the sake of brevity, it is assumed that the reference transmittance is transmittance that is half of a peak of transmittance included in the transmission frequency characteristics.

Hereinafter, for the sake of brevity, the transmission frequency characteristics of the optical filter 1 with respect to each first combination are assumed to be characteristics having a single peak with a full width at half maximum of approximately 50 GHz.

Hereinafter, for the sake of brevity, a frequency indicated by the frequency information is assumed to be 187.8 THz.

Hereinafter, for the sake of brevity, in FIG. 7, it is assumed that the guaranteed operating temperature range is equal to or higher than 0° C. and equal to or lower than 80° C. and that a reference measured temperature is 25° C. The reference measured temperature is an element measured temperature at which a frequency indicated by the frequency information reaches a peak frequency at the prescribed filter incidence angle (hereinafter, referred to as "reference filter incidence angle") determined in advance.

An abscissa in FIG. 7 represents element measured temperature. An ordinate in FIG. 7 represents peak frequency. The ordinate in FIG. 7 represents frequencies from 187.7 THz to 187.9 THz. 187.7 THz and 187.9 THz are frequencies that are adjacent to 187.8 THz in a system in which frequency intervals of light are set to 100 GHz.

FIG. 7 shows that, when the filter incidence angle is the reference filter incidence angle and the element measured temperature is the reference measured temperature, the peak frequency is 187.8 THz. FIG. 7 shows that, when the filter incidence angle is the reference filter incidence angle and the element measured temperature is the reference measured temperature, a frequency within a range from (187.8−0.025) THz to (187.8+0.025) THz is the transmission frequency.

FIG. 7 shows that, when the measured temperature is lower than 5'C and the filter incidence angle is the reference filter incidence angle, the peak frequency is a frequency that is higher than 187.8 THz by 0.25 THz or more. This means that, when the measured temperature is lower than 5'C and the filter incidence angle is the reference filter incidence angle, the frequency indicated by the frequency information is not the transmission frequency. Therefore, for example, FIG. 7 shows that, when the measured temperature is lower than 15° C., the frequency indicated by the frequency information changes from a non-transmission frequency to the transmission frequency by rotating the optical filter 1 by an angle that causes the peak frequency to drop by 30 GHz. In this case, a non-transmission frequency refers to a frequency that is not the transmission frequency.

FIG. 7 shows that, when the measured temperature exceeds 45° C. and the filter incidence angle is the reference filter incidence angle, the peak frequency is a frequency that is lower than 187.8 THz by 0.25 THz or more. This means that, when the measured temperature exceeds 45° C. and the filter incidence angle is the reference filter incidence angle, the frequency indicated by the frequency information is not the transmission frequency. Therefore, for example, FIG. 7 shows that, when the measured temperature exceeds 45° C., the frequency indicated by the frequency information changes from a non-transmission frequency to the transmission frequency by rotating the optical filter 1 by an angle that causes the peak frequency to rise by 50 GHz.

The optical wavelength-selective filter module 100 according to the first embodiment which is configured as described above rotates the optical filter 1 based on an element measured temperature that indicates a temperature in accordance with a temperature of the optical filter 1 and frequency information, and transmits light of a frequency indicated by the frequency information at transmittance that is equal to or higher than reference transmittance.

Therefore, the optical wavelength-selective filter module 100 configured as described above is capable of transmitting light of the frequency indicated by the frequency information at transmittance that is equal to or higher than the reference transmittance without having to observe the transmitted light Lout. Therefore, the optical wavelength-selective filter module 100 configured as described above can realize both compensation of a shift in transmission frequency (transmission wavelength) caused by a temperature variation of an optical filter and simplification of an apparatus.

(Modification)

The relationship information may be information which associates respectively different pieces of filter orientation information with four or more different element measured temperatures for each prescribed frequency.

Figure 8:
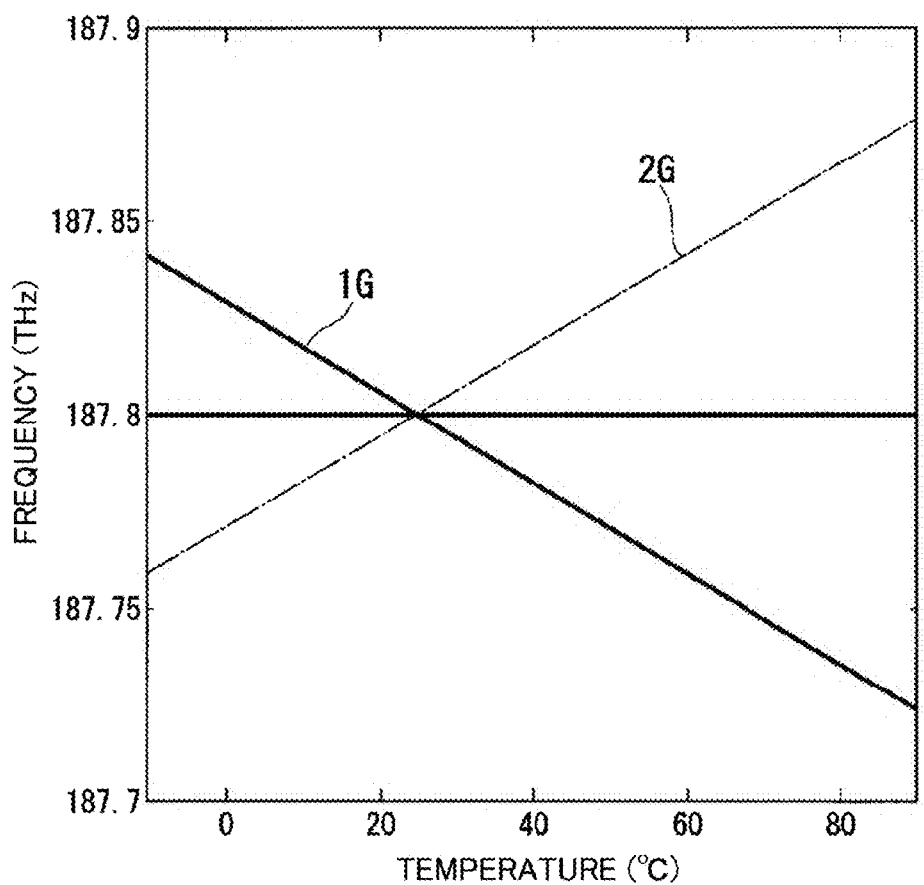
FIG. 8 is a diagram showing an example of a change in a peak frequency caused by rotating the optical filter 1 based on relationship information according to a modification of the first embodiment.

FIG. 8 is a diagram showing an example of a change in peak frequency caused by changing the orientation of the optical filter 1 based on the relationship information according to a modification of the first embodiment.

More specifically, FIG. 8 is a diagram showing a change in peak frequency caused by changing the orientation of the optical filter 1 based on an example of the relationship information which consecutively associates respectively different filter incidence angles with different element measured temperatures for each prescribed frequency.

An abscissa in FIG. 8 represents element measured temperature. An ordinate in FIG. 8 represents peak frequency.

In FIG. 8, a graph 1G shows element measured temperature dependency of the peak frequency when the filter incidence angle is constant. FIG. 8 shows that, when a temperature represented by the abscissa is the element measured temperature, a shift of the peak frequency due to the temperature dependency represented by the graph 1G can be made 0 by continuously rotating the optical filter 1 with respect to the element measured temperature so that the filter incidence angle becomes a filter incidence angle which causes a frequency indicated by a graph 2G to equal the peak frequency at the reference measured temperature.

It should be noted that the relationship information corresponding to the graph 2G in FIG. 8 may be a function for each prescribed frequency and to which the element measured temperature is input and which outputs the filter orientation information. When the relationship information is a function, the control unit 501 can uniquely determine the filter orientation in accordance with the element measured temperature.

The optical wavelength-selective filter module 100 according to a modification of the first embodiment configured as described above changes the orientation of the optical filter 1 based on the relationship information which associates respectively different pieces of filter orientation information with four or more different element measured temperatures for each prescribed frequency. Therefore, the optical wavelength-selective filter module 100 according to a modification of the first embodiment configured as described above is capable of controlling transmittance of light of a frequency indicated by the frequency information with higher accuracy than the optical wavelength-selective filter module 100 according to the first embodiment.

When the optical filter 1 is a dielectric multilayer film filter, since a transmission wavelength of the dielectric multilayer film filter is longest when filter incidence angle $\theta=0$, the optical wavelength-selective filter module 100 cannot transmit light with a longer wavelength than the wavelength when filter incidence angle $\theta=0$.

In consideration thereof, a temperature range that can be subjected to compensation can be expanded by using an optical filter 1 of which the peak frequency at the reference measured temperature when filter incidence angle $\theta=0$ is a lower frequency than a desired frequency.

When using such an optical filter 1, a certain inclination angle is necessary as the filter incidence angle at the reference measured temperature in order to cause the peak frequency to equal the desired frequency. In this case, the dielectric multilayer film filter may be obliquely attached to the actuator 2 to begin with.

Second Embodiment

Figure 9:
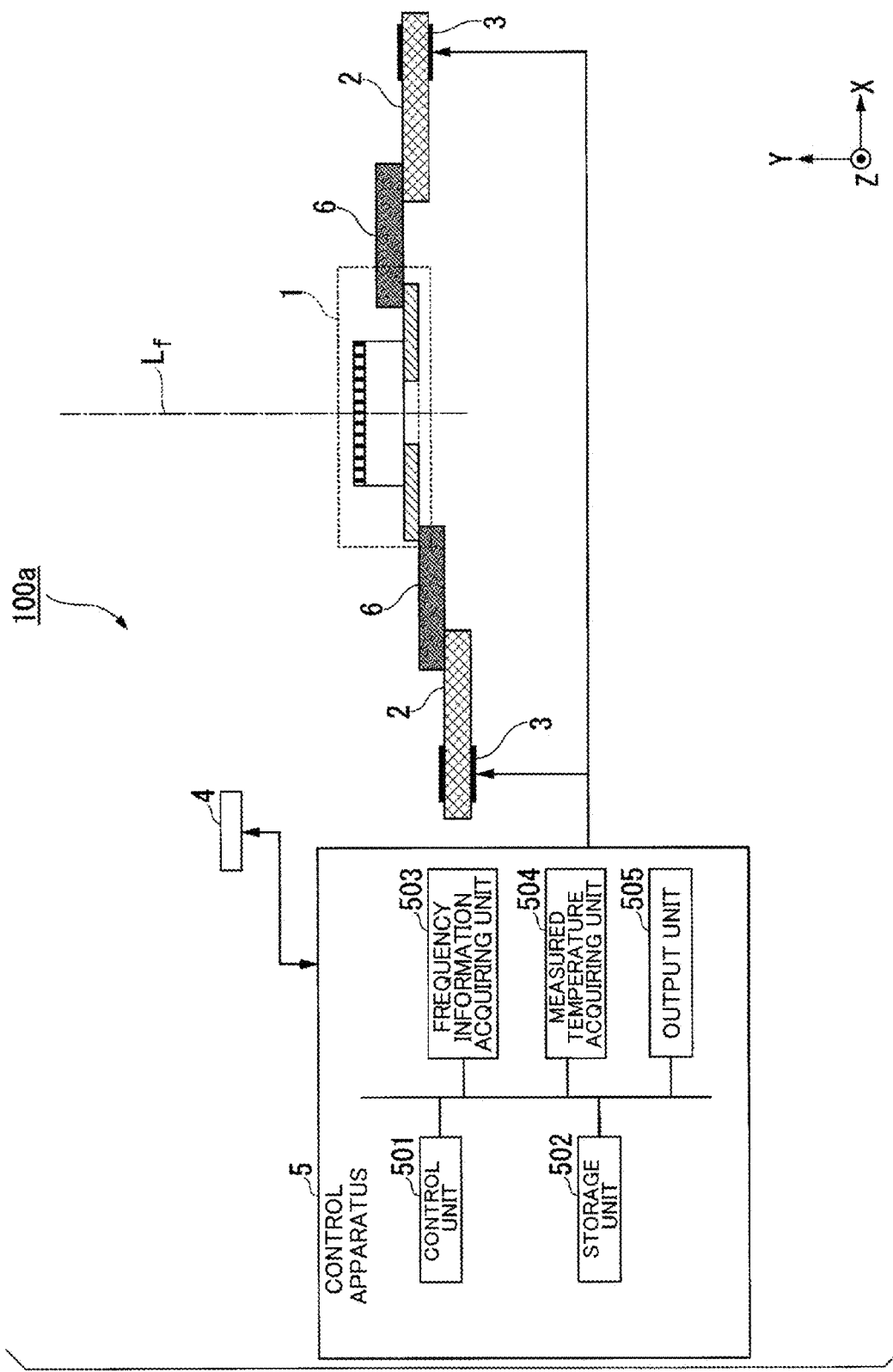
FIG. 9 is a diagram showing an example of a functional configuration of an optical wavelength-selective filter module 100a according to a second embodiment.

FIG. 9 is a diagram showing an example of a functional configuration of an optical wavelength-selective filter module 100*a* according to a second embodiment.

The optical wavelength-selective filter module 100*a* differs from the optical wavelength-selective filter module 100*a* in further including a deforming element 6 in addition to the optical filter 1, the actuator 2, the drive unit 3, the temperature measuring element 4, and the control apparatus 5.

The deforming element 6 deforms into a prescribed shape in accordance with a temperature (hereinafter, referred to as a "deforming element temperature") of the deforming element 6 in response to a change in the deforming element temperature. The deforming element 6 may be any kind of element as long as the element deforms into a prescribed shape in accordance with the deforming element temperature in response to a change in the deforming element temperature. For example, the deforming element 6 may be a beam that includes a bimetal that becomes bowed in accordance with the deforming element temperature or a shape-memory alloy that becomes bowed in accordance with the deforming element temperature. The deforming element 6 may be a torsion bar constituted of a bimetal or a shape-memory alloy.

The deforming element 6 is positioned at a location at which the deforming element temperature is in a relationship of a one-to-one correspondence with the filter temperature. The deforming element 6 is provided between the optical filter 1 and the actuator 2. The deforming element 6 rotates the optical filter 1 by a prescribed angle in accordance with the deforming element temperature by deforming into a shape in accordance with the deforming element temperature.

Therefore, in the optical wavelength-selective filter module 100*a*, the orientation of the optical filter 1 is changed by at least one of control by the actuator 2 and a deformation of the deforming element 6.

FIG. 10 is a diagram showing an example of the optical wavelength-selective filter module 100*a* according to the second embodiment in a state where the optical filter 1 has been rotated by the actuator 2 and the deforming element 6.

FIG. 10 shows that the optical filter 1 has been rotated by the actuator 2 and the deforming element 6 by an angle $\theta$ from the state shown in FIG. 9. When the filter incidence angle shown in FIG. 9 is 0 deg, the filter incidence angle in FIG. 10 is $\theta$.

A relationship among the frequency, the element measured temperature, and the filter orientation information which is stored by the optical wavelength-selective filter module 100*a* configured as described above may be a slight relationship which, for example, compensates for nonlinearity of a relationship between the orientation of the optical filter 1 due to a deformation of the deforming element 6 in a vicinity of upper and lower limits of a guaranteed operating temperature range and the deforming element temperature. In other words, with the optical wavelength-selective filter module 100*a* according to the second embodiment, an effect similar to a case of expanding the unregulated temperature range shown in FIG. 7 is produced as compared to the optical wavelength-selective filter module 100 according to the first embodiment.

In addition, since the optical wavelength-selective filter module 100*a* configured as described above includes the deforming element 6, the optical filter 1 rotates by a prescribed angle in accordance with temperature due to a deformation of the deforming element 6 in addition to drive by the actuator 2. Therefore, with the optical wavelength-selective filter module 100*a* according to the second embodiment, consumption of energy for drive that is consumed by the drive unit 3 and the actuator 2 when rotating the optical filter 1 by a prescribed angle can be reduced as compared to the optical wavelength-selective filter module 100 according to the first embodiment.

Furthermore, with the optical wavelength-selective filter module 100*a* configured as described above, temperature compensation that is performed using the actuator 2 becomes unnecessary if a permissible amount of wavelength shift that is determined by an applicable optical access system is within a range of transmission frequencies that varies in accordance with a deformation of the deforming element 6. Therefore, the optical wavelength-selective filter module 100*a* according to the second embodiment can reduce a setting operation of a relationship between temperature and orientation difference as compared to the optical wavelength-selective filter module 100 according to the first embodiment.

All of or a part of respective functions of the control apparatus 5 that is included in the optical wavelength-selective filter module 100 may be realized using a computer and a control program or may be realized using hardware such as an ASIC (Application Specific Integrated Circuit), a PLD (Programmable Logic Device), or an FPGA (Field Programmable Gate Array). The control program and the relationship information may be stored in a computer-readable recording medium. Examples of the computer-readable recording medium include a portable medium such as a flexible disk, a magneto-optical disk, a ROM, or a CD-ROM and a storage apparatus such as a hard disk that is built into the computer system. Alternatively, the control program and the relationship information may be transmitted via an electric communication line.

While embodiments of the present invention have been described in detail with reference to the drawings, it is to be understood that specific configurations are not limited to these embodiments and that the present invention includes designs and the like which do not constitute departures from the gist of the present invention.

REFERENCE SIGNS LIST 100, 100a Optical wavelength-selective filter module
1 Optical filter
2 Actuator
3 Drive unit
4 Temperature measuring element
5 Control apparatus
6 Deforming element
501 Control unit
502 Storage unit
503 Frequency information acquiring unit
504 Measured temperature acquiring unit
505 Output unit
510 Filter orientation determining unit
520 Control signal generating unit

The invention claimed is:

1. An optical wavelength selecting filter-module into which light is incident from a prescribed direction determined in advance, the optical wavelength-selective filter module comprising:
an optical filter of which an orientation can be changed;
a processor; and a non-transitory computer-readable recording medium having computer program instructions stored thereon, wherein the computer program instructions, when executed by the processor, perform processing of:
acquiring frequency information that is information indicating a frequency of light to be transmitted through the optical filter;
acquiring temperature information that indicates a temperature of the optical filter;
determining an orientation of the optical filter based on relationship information that is information associating, for each prescribed frequency, the temperature and an orientation of the optical filter at which light of the frequency is transmitted through the optical filter at transmittance equal to or higher than prescribed transmittance at the temperature, a temperature indicated by the temperature information, and a frequency indicated by the frequency information;
an actuator which points the optical filter in the orientation; and
a deforming element which deforms into a prescribed shape in accordance with a temperature as a result of a change in the temperature, wherein the orientation of the optical filter is changed by at least one of a drive by the actuator and a deformation of the deforming element.

2. The optical wavelength selecting filter-module according to claim 1, wherein an orientation of the optical filter is changed by a rotation around a rotation axis that is perpendicular to an optical path of the light,
wherein the computer program instructions further perform processing of:
the determining an incidence angle of the light with respect to the optical filter as the orientation, and
wherein the actuator rotates the optical filter in accordance with the incidence angle.

3. An optical wavelength selecting method that is performed by an optical wavelength-selective filter which includes an optical filter of which an orientation can be changed, the optical wavelength selecting method comprising:
acquiring the frequency information that is information indicating a frequency of light to be transmitted through the optical filter;
acquiring temperature information that indicates a temperature of the optical filter;
determining an orientation of the optical filter based on relationship information that is information associating, for each prescribed frequency, the temperature and an orientation of the optical filter at which light of the frequency is transmitted through the optical filter at transmittance equal to or higher than prescribed transmittance at the temperature, a temperature indicated by the temperature information, and a frequency indicated by the frequency information;
pointing the optical filter in the orientation; and
deforming a deforming element which deforms into a prescribed shape in accordance with a temperature as a result of a change in the temperature, wherein the orientation of the optical filter is changed by at least one of a drive by the actuator and a deformation of the deforming element.

* * * * *